Figures 1, 4:
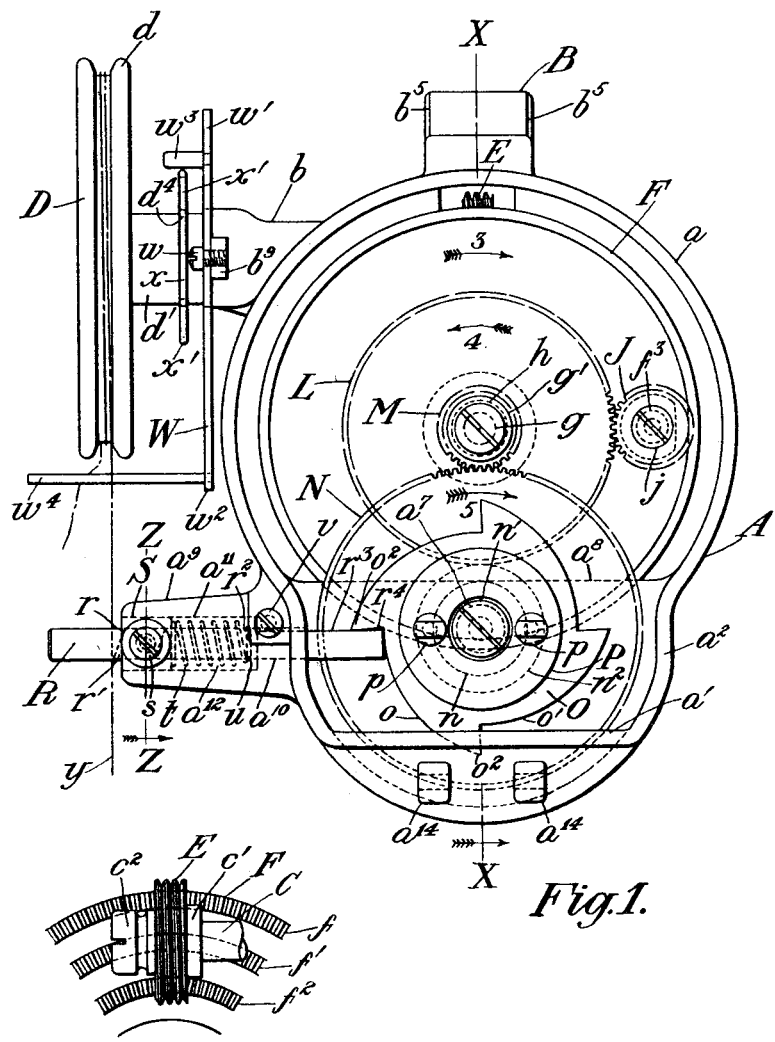

G. W. FOSTER.
MEASURING DEVICE.
APPLICATION FILED NOV. 1, 1912.

1,108,353.

Patented Aug. 25, 1914.
2 SHEETS—SHEET 1.

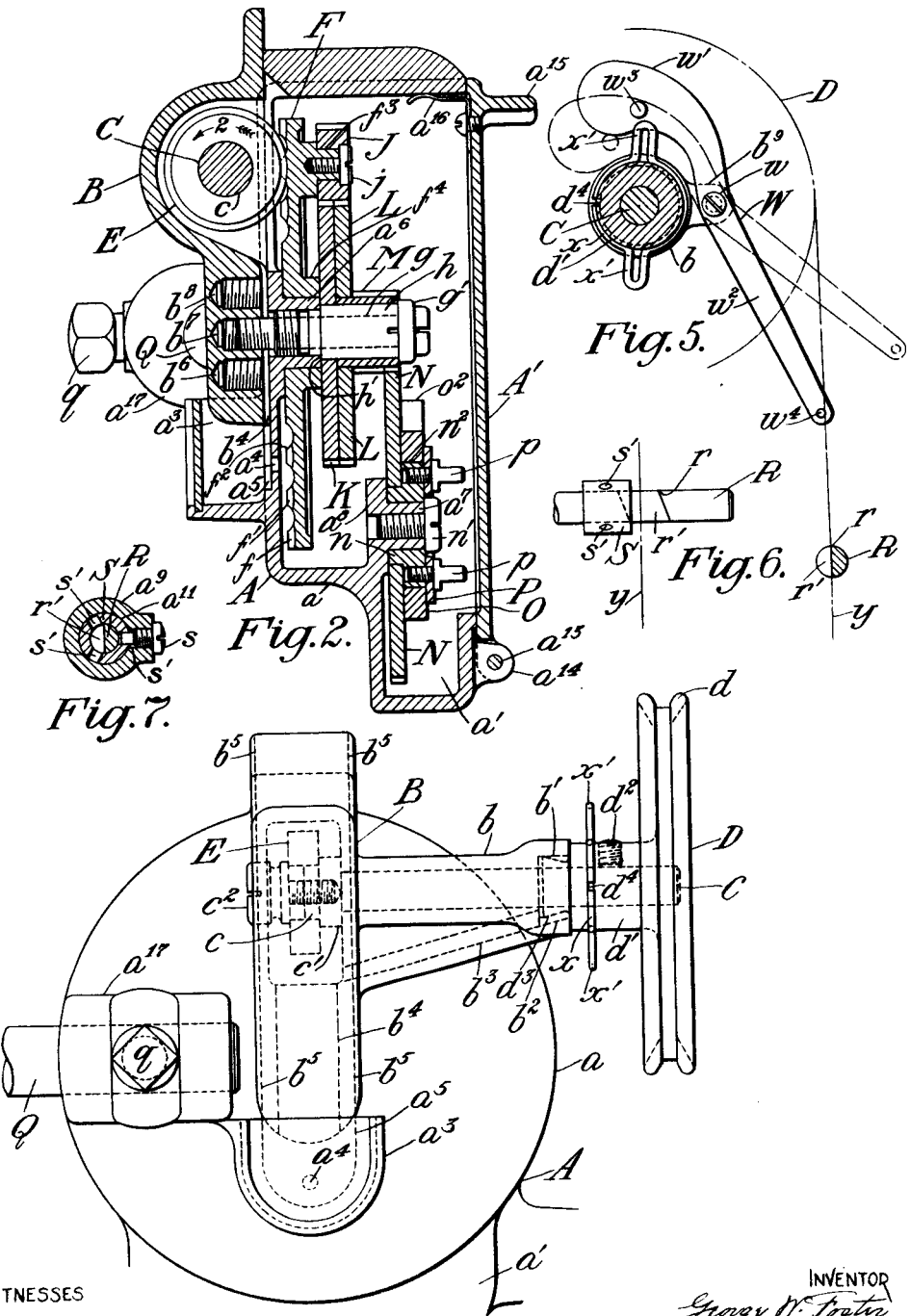

UNITED STATES PATENT OFFICE.

GEORGE W. FOSTER, OF PROVIDENCE, RHODE ISLAND.

MEASURING DEVICE.

1,108,353.  Specification of Letters Patent.  Patented Aug. 25, 1914.

Application filed November 1, 1912. Serial No. 728,985.

*To all whom it may concern:*

Be it known that I, GEORGE W. FOSTER, a citizen of the United States, residing at Providence, in the county of Providence and State of Rhode Island, have invented certain new and useful Improvements in Measuring Devices, of which the following is a specification.

My invention relates to measuring-devices for measuring thread, yarn, twine or the like and for severing the material after a predetermined length has been reeled off from the supply.

The device is designed particularly for use with winding, warping or other machines in which it is required to wind a certain length of material into a cop, ball or package or on to a spool.

The object of my invention is to provide a device in which the cutting-off or severing-mechanism is operated positively from the rotation of the measuring-wheel or drum, without requiring that the device be set each time, and without the employment of friction driving-devices or releasable clutches.

A further object of my invention is to provide for quick and easy adjustment of the device to adapt it to a wide range of work, to measure different lengths of material, without affecting the positive control of the severing-means.

The invention is fully described in the following specification, illustrated by the accompanying drawings, in which:—

Figure 1 is a front elevation of the device showing it with the cover-plate removed from the casing to illustrate the mechanism inclosed therein; Fig. 2, a vertical, sectional view taken on the line X—X of Fig. 1, looking in the direction indicated by the arrow; Fig. 3, a rear view of the upper portion of the device; Fig. 4, a detail view showing the arrangement of the drive-worm and driving-gear; Fig. 5, a detail view of the stopping or brake-device for the measuring-wheel; Figs. 6 and 7, detail views of the severing-device, the latter being a section taken on the line Z—Z of Fig. 1, looking in the direction indicated by the arrow.

My new device is similar in some respects to the measuring instrument shown and described in my previous U. S. Patent No. 1,005,823, granted Oct. 17, 1911, but certain modifications are herein disclosed which result in important improvements.

Referring to the drawings, the mechanism of the device is arranged in an oil-tight casing A preferably having its upper portion $a$ of circular form with a depending, semicircular trough $a'$, the surrounding rim $a^2$ being proportioned to conform to the outlines of the offset gears inclosed therein. Fastened to the rear of the main casing A is a bracket B having an offset arm $b$ which serves as a bearing for the horizontal shaft C to which the measuring-wheel D is secured, see Fig. 3. I have preferred to show the wheel D of well known construction with a grooved rim $d$ and a hub $d'$ bored to receive the shaft C to which it is secured by the set-screw $d^2$. In place of the wheel D, however, any usual form of reel or drum might be employed. The inner end of the hub $d'$ of the wheel D is formed with a tapered oil-flange $d^3$ fitting a counterbore $b'$ at the end of the arm $b$ and adapted to collect the oil which leaches out along the shaft C and to deflect it into the drip-pocket $b^2$. From the pocket $b^2$ the oil drains back through the inclined hole $b^3$ which leads into a vertical groove $b^4$ on the back of the bracket B, see Fig. 2, the latter opening into a catch-basin or trough $a^3$ formed on the back of the casing A. The trough $a^3$ has an opening $a^4$ leading into the main casing A, and hence the oil which escapes from the bearing of the shaft C eventually finds its way back to the interior of the casing and is taken up and distributed to all parts of the mechanism by the various intermeshing gears to be later described.

The shaft C carries a worm E at the opposite end from the wheel D, see Figs. 2 and 4, which is arranged to rotate the main driving-gear F of the mechanism. The worm E is bored to receive the end $c$ of the shaft C and abuts the collar $c'$, preferably formed on the shaft, against which it is secured by the axial screw $c^2$. The head of the screw $c^2$ passes through a hole in the side of the bracket B and fits the latter with a very slight clearance so as to prevent the escape of oil at this point. The collar $c'$ and the hub of the wheel D abut the ends of the bearing $b$ to hold the shaft C in place as shown in Fig. 3. Preferably, the gear F is formed as a disk having a novel arrangement of gear teeth on its inner face as now described: These gear teeth are arranged in concentric rings $f$, $f'$ and $f^2$, as shown more particularly in Fig. 4, and the worm E is adapted to be engaged with any one set of teeth so that the ratio between the worm and worm-wheel F can be altered within certain limits by adjusting the worm toward or away from the axis of the wheel. I have preferred to show the disk or gear F formed with three sets of teeth and in Figs. 2 and 4 the worm E is illustrated in engagement with the intermediate set $f'$, but it is obvious that a greater number of gear-rings or sets of teeth might be provided if desired. The worm E is adjusted to bring it into engagement with the different gear-rings by sliding the bracket B up and down on the casing A, provision for this being made as follows:

The sides of the bracket B are machined at $b^5$, $b^5$ to provide a tongue adapted to fit a vertical groove $a^5$ formed in the back of the casing A, see Figs. 2 and 3. This allows the bracket to be slid up and down on the casing while the tongue-and-groove connection prevents it from turning in relation thereto. Extending through the back of the casing is a screw $g$ adapted to engage any one of the threaded holes, $b^6$, $b^7$, $b^8$ in the bracket B, the holes being spaced a distance apart equal to the distance between the gear-rings $f$, $f'$ and $f^2$. The holes $b^6$, $b^7$ and $b^8$ are so positioned in relation to the axis of the worm E that the latter will come opposite one of the gear-rings when the screw $g$ is screwed into the appropriate hole. The screw $g$ extends through an axial bore in a stud $h$ which is screwed into a boss $a^6$ on the inside of the casing A. A shoulder $h'$ on the stud $h$ abuts the end of the boss $a^6$ and the enlarged head $g'$ of the screw $g$ is set up against the end of the stud $h$ to clamp the bracket B tightly against the back of the casing A.

The worm-gear F is mounted to rotate on the boss $a^6$ and adjacent its periphery carries a planet-gear or pinion J rotatable on the projecting stud $f^3$ and held in place by the screw $j$. The pinion J meshes with two adjacent gears K and L which rotate on an axis common with that of the worm-gear F. The inner gear K is driven tightly onto the stud $h$ to be held thereby against rotation and it will be noted that its inner face abuts the end of the hub $f^4$ of the worm-gear F to hold the latter in place on the boss $a^6$. The gear L is driven onto the hub of a pinion M and rotates therewith on the stud $h$, being held in place by the enlarged portion of the head $g'$ of the screw $g$. The pinion M meshes with a gear N which rotates on a bearing $a^7$ projecting from a web $a^8$ extending across the casing A above the trough-portion $a'$. Preferably, the gear N is forced or driven on to a flanged bushing $n$ which is held in place on the bearing $a^7$ by the screw $n'$. Mounted on the flange $n^2$ of the bushing $n$ is the cam-wheel O which controls the operation of the thread-severing mechanism. Preferably, the wheel O is clamped against the side of the gear N by a ring P secured by the screws $p$, $p$. This arrangement provides for easy removal of the cam-wheel which can be made interchangeable with others of different design so that the timing of operation of the severing-mechanism can be altered.

The severing-mechanism is constructed and arranged as follows: Extending from the side of the lower trough-portion $a'$ of the casing A is an arm $a^9$ having a bore $a^{10}$ adapted to receive the sliding plunger or cutter-bar R, and a longer counterbore $a^{11}$ reaching in from its outer end to form a chamber or pocket $a^{12}$ surrounding the bar. Fitted to the end of the counterbore $a^{11}$ is a cylindrical bushing S in which the bar R also slides. The bushing S is held in place by a screw $s$ which reaches through the side of the arm $a^9$ with its reduced end adapted to engage one of several radial holes $s'$, $s'$ in the bushing, see Fig. 7. The outer edge of the bore of the bushing S coöperates with the cutting edge $r$ of the cutter-bar R and the several holes $s'$, $s'$ provide for turning the bushing after a portion of its edge becomes dulled so as to present a new cutting surface to the material. The cutting edge $r$ is formed on the bar R by milling a cross-slot $r'$ through approximately half its diameter with the sides of the slot having a slight angle to a plane perpendicular to the axis of the bar, see Figs. 6 and 7. The cutter-bar R is operated by a coiled spring $t$ arranged in the pocket $a^{12}$ with one end bearing against the end of the bushing S and the other held by a wire ring $u$ sprung into an annular groove $r^2$ formed on the periphery of the bar. The inner end of the bar R is adapted to ride on the cam-faces $o$, $o'$, etc., of the cam-wheel O which is formed similar to a ratchet-wheel, and illustrated in the drawings as having four teeth or cam-points $o^2$. The upper side of the rod R is preferably flatted at $r^3$ along a portion of its length to provide a straight edge $r^4$ adapted to ride off from the edges of the cam-teeth $o^2$. A screw $v$ extends through the side of the arm $a^9$ with its end engaging the flatted side of the rod R to prevent it from turning so that its cutting edge will always be maintained in proper relation to the thread and its rear edge $r^4$ square with the cam-teeth.

The braking-mechanism for the measuring-wheel is arranged as follows: Projecting from the side of the arm $b$ of the bracket B is a lug $b^9$, see Figs. 1 and 5, on which is pivoted a stop-lever W by means of a screw $w$. The lever W is formed with a curved weight-arm $w'$ reaching up over the arm $b$, and a depending arm $w^2$ extending downward to a point adjacent the path of the thread or yarn $y$ which leads up over the measuring-wheel D. Projecting from the side of the weight-arm $w'$ is a pin $w^3$, and a rod or wire $w^4$ is driven into the end of the arm $w^2$ and extends at right-angles thereto to bear against the thread $y$. Referring now to Figs. 3 and 5, an annular groove $d^4$ is formed on the periphery of the hub $d'$ and into this is sprung a wire ring $x$. The wire of the ring $x$ is bent out in loops to form radially-projecting lugs or spurs $x'$, $x'$ adapted to be engaged by the pin $w^3$ on the lever W. I have shown two of these spurs $x'$, $x'$ arranged opposite each other on the ring $x$, but a greater number might be provided if desired. The ring $x$ is not held positively on the hub $d'$, but engages the latter with just enough friction to allow a slight slippage, so that the rotation of the wheel D will not be brought to an abrupt stop or snubbed too quickly. This prevents the spur $x'$ from rebounding backward from the pin $w^3$ and therefore provides against the wheel D rotating backward from the effect of its momentum being suddenly checked.

Hinged to the front of the casing A is a door or cover-plate A' pivoted on a pin $a^{13}$ driven through two ears $a^{14}$ adjacent the bottom of the trough-portion $a'$. At the top of the cover-plate is a finger-piece or handle $a^{15}$, and secured on the inside is a spring-latch $a^{16}$ which engages the inside of the casing A to hold the cover in place, as illustrated in Fig. 2. On the back of the casing is a lug or projection $a^{17}$ bored to receive the rod Q which may be a part of the machine to which my device is attached or any rod supported to project therefrom. The usual set-screw $q$ serves to hold the casing firmly in position on the rod.

The operation of my new device is as follows: The thread or yarn $y$ is led up from its source of supply, generally placed below, but not here shown, and passing in back and across the cutter-bar R and over the wire $w^4$ on the brake-lever W, see Figs. 1 and 5, is given one or more turns about the measuring-wheel D. Thence the thread leads to the winding or other machine, by which it is taken up in the course of the operation of the latter. The draft of the thread $y$ turns the wheel D to rotate the shaft C in the direction indicated by the arrow 2, Fig. 2. The wheel D drives the worm E which turns the gear F in the direction indicated by the arrow 3, Fig. 1, with the planet-gear J moving in the same direction and traveling over the teeth on the gears K and L. The gear L has 100 teeth and the gear K has one more, or 101. Consequently, when the planet-gear J has made one complete revolution with the gear F the gear L will have been caused to turn in the direction indicated by the arrow 4, Fig. 1, through a space of one tooth or one one-hundredth of a revolution, this arrangement being the same as in my U. S. patent, previously referred to. The pinion M has 30 teeth and the gear N 120 teeth so that one rotation of the gear L and its pinion M will turn the gear N in the direction indicated by the arrow 5, Fig. 1, through one-quarter of a rotation. As before explained, the cam-wheel O here shown has four teeth $o^2$ and hence a quarter turn of the gear N, to which the cam-wheel is secured, will cause any one of the cam-faces $o$ to wipe completely across the end of the cutter-bar R. That is to say, with the parts in the position as shown in Fig. 1, which illustrates the mechanism at the beginning of the operation of the device, a one-quarter rotation of the cam-wheel O will cause the rod R to slide outward in its bearing to carry the cutting edge $r$ beyond the thread $y$ as shown in Fig. 6, and to compress the spring $t$ to energize the latter. The cam-wheel O will now release the bar, as its end rides off the cam-point $o^2$ and the spring $t$ will then cause the rod R to be quickly retracted and the cutting edge $r$ will draw the thread against the edge of the bushing S to sever it. As the thread is severed it releases the lever W and the weight of the arm $w'$ causes the pin $w^3$ to engage one of the spurs $x'$ to arrest the rotation of the measuring-wheel as before explained.

The rim of the measuring-wheel D as here shown is designed to be approximately nine inches in circumference so that four rotations of the wheel will reel off one yard of material. As a matter of fact, the wheel is usually made a trifle less than nine inches in circumference to provide for the slight slippage that is bound to occur between the yarn and the wheel; it having been determined by experiment just what the ratio of this slippage is. For the present purpose, however, it is correct to state that when one yard of material has been drawn over the wheel the latter will have been turned through four complete rotations and as the worm E is of single pitch the worm-gear F will have been moved four teeth. As here illustrated the inner gear-ring $f^2$ is formed with 72 teeth; the intermediate ring $f'$ with 96 teeth; and the outer ring $f$ with 120 teeth; the ratio being: 3 to 4 to 5, although, of course, other combinations might be used. With the worm E arranged to engage the intermediate ring $f'$ it will require 96 revolutions of the measuring-wheel to turn the gear F through one complete revolution. Now, since it takes four revolutions of the measuring-wheel to reel off one yard of material, one-fourth of 96 or 24 yards of material will have been reeled off during one rotation of the gear F. One rotation of the gear F turns the gear L through one one-hundredth of a rotation and hence it requires the reeling off of 2400 yards of material to turn the pinion M through one rotation. As before explained, one complete rotation of the pinion M turns the gear N through one-quarter of a rotation and with the cam-wheel O constructed as here shown, that is, with four teeth, the cutting-off mechanism is thus caused to operate to sever the thread after 2400 yards have been passed over the measuring-wheel.

By substituting a cam-wheel formed with two points, instead of four, the device may be made to measure twice as much material or 4800 yards; and by employing a cam-wheel with only one point, four times 2400 or 9600 yards will be measured before the thread is severed. Other variations in the yardage to be measured are obtained by adjusting the worm E to mesh with the different gear-rings on the worm-gear F. For instance, using the four-point cam-wheel illustrated in the drawings, by adjusting the worm to mesh with the inner gear-ring $f^2$, which has 72 teeth, 18 yards will be measured during one rotation of the gear F, and 100 times that or 1800 yards while the cam-wheel is rotated one-quarter of a turn to bring the cutting-off mechanism into operation. With the worm E engaging the outer ring $f$, which has 120 teeth, 30 yards will be measured during one revolution of the planet-gear J, and 3000 yards during the 100 revolutions of the latter which are necessary to operate the severing-mechanism. It will also be seen that by using other ratios between the cam-wheel and gear-rings a great many different combinations can be arrived at so that my new device is given a wide range of action and may be adapted to practically all units of yardage that are required to be measured for commercial or mill uses. It is also to be noted that these adjustments can be made very conveniently and expeditiously; and, furthermore, once the instrument is set for a given yardage it requires no further attention on the part of the operator. That is to say, the measuring-mechanism does not require resetting after each operation, but upon the completion of one measurement, and after the severing of the material, the parts are always in position to commence the measuring of another length. Devices of this class are generally employed in connection with textile machines arranged to be stopped automatically upon the release of the tension on the supply thread. In this way my new measuring-device acts to arrest the operation of the winding or other machine to which it is attached by severing the thread after a predetermined length has been measured. When the machine is started again to wind another length no attention on the part of the operator is required to the measuring instrument, while with other devices it is necessary to set them each time before the winding is commenced. The mechanism of my new device is extremely simple, its arrangement very compact and ample provision is made for lubrication without danger of leakage of oil which would be liable to damage the material.

Various modifications might be made in the form and structure of the elements of the mechanism without departing from the spirit or scope of the invention, therefore, without limiting myself to the exact construction shown, what I claim is:—

1. In a measuring-device, the combination with means for severing the material after a predetermined length has been measured, of timing-mechanism for operating the severing-means, a member operated by the draft of the material being measured, a worm driven thereby, and a worm-gear having concentric rings of gear-teeth adapted to be interchangeably engaged with the worm, said gear arranged to operate the timing-mechanism.

2. In a measuring-device, the combination with means for severing the material after a predetermined length has been measured, of a timing-mechanism for operating the severing-means, a driving-gear having concentric gear-rings of different diameters, a worm adapted to mesh with any one of the rings, a bearing for the worm adjustable to bring the latter into mesh with the various gear-rings, and means operated by the draft of the material being measured to drive the worm.

3. In a measuring-device, the combination with the timing-mechanism therefor, of means operated thereby to sever the material after a predetermined length has been measured, a driving-gear for the timing-mechanism, and a gear driven from the material being measured and arranged to be engaged with the driving-gear at different distances from its axis to regulate the time of action of the severing-means.

4. In a measuring-device, the combination with means for severing the material after a predetermined length has been measured, of means for actuating the severing-means, timing-devices for releasing the actuating-means, a driving-gear therefor, a gear driven from the material being measured, and means to adjust the driven gear in relation to the axis of the driving-gear to vary the ratio between the two and change the time of action of the severing-means.

5. In a measuring-device, the combination with a casing, of timing-mechanism inclosed therein, means operated thereby to sever the material after a predetermined length has been measured, a driving-gear formed with concentric gear-rings of different diameters, a worm adapted to mesh with the different gear-rings, and a bracket adjustable on the casing to regulate the position of the worm in relation to the axis of the gear.

6. In a measuring-device, the combination with a casing, of timing-mechanism inclosed therein, means operated thereby for severing the material after a predetermined length has been measured, a driving-gear formed with concentric gear-rings, a worm adapted to mesh with the different gear-rings, a bracket slidable on the casing to adjust the worm in relation to the driving-gear, and means to secure the bracket in appropriate positions to bring the worm into mesh with the different gear-rings.

7. In a measuring-device, the combination with a casing, of timing-mechanism inclosed therein, means operated thereby for severing the material after a predetermined length has been measured, a driving-gear for actuating the timing-mechanism formed with concentric gear-rings, a worm adapted to mesh with any one of the gear-rings, a bearing for supporting the worm in relation to the driving-gear, and means on the casing adapted to register with means on the bracket to secure the latter in appropriate positions to bring the worm into mesh with the different gear-rings.

8. In a measuring-device, the combination with a casing, of timing-mechanism inclosed therein, means operated thereby for severing the material after a predetermined length has been measured, a driving-gear formed with concentric gear-rings, a worm adapted to mesh with any one of said rings, a bracket slidable on the casing to adjust the worm in relation to the gear-rings, said bracket formed with holes spaced equidistantly with the gear-rings, and a screw in the casing adapted to engage the holes in the bracket to secure the latter with the worm in appropriate relation to the different gear-rings.

9. In a measuring-device, the combination with a casing, of timing-mechanism inclosed therein, means operated thereby for severing the material after a predetermined length has been measured, a driving-gear formed with concentric gear-rings, a bracket adjustably mounted on the casing, a shaft mounted in a bearing on said bracket, a worm on the shaft adapted to mesh with the different gear-rings of the driving-gear, and a measuring-wheel on said shaft adapted to be rotated by the material being measured.

10. In a measuring-device, the combination with means for severing the material after a predetermined length has been measured, of an interchangeable cam for controlling the operation of the severing-means, timing-mechanism for actuating the cam, a driving-gear for the timing-mechanism formed with concentric gear-rings of different diameters, a worm adapted to be engaged with the different gear-rings, and means to drive the worm from the draft of the material being measured.

11. In a measuring-device, the combination with a worm adapted to be rotated from the draft of the material being measured, a driving-gear formed with concentric gear-rings adapted to be individually engaged by the worm, a cam-gear driven from the driving-gear, a cam-wheel detachably mounted on the cam-gear, and a severing-mechanism arranged to be actuated from the cam-wheel to sever the material after a predetermined length has been measured.

12. In a measuring-device, the combination with a rotatable shaft C, of means to rotate the shaft from the draft of the material being measured, a worm E on the shaft, a driving-gear F formed with concentric gear-rings of different diameters, means to adjustably support the shaft C to engage the worm with the various gear-rings, a planet-gear J rotatable on the driving-gear and revolved therewith, a gear K fixedly mounted on the axis of the driving-gear to be engaged by the planet-gear, a second gear L mounted rotatably on the same axis and also engaged by the planet-gear, the gear L having a less number of teeth than the gear K, a pinion M rotated by the gear L, a gear N rotated by the pinion M, a cam-wheel O driven by the gear N, and severing-means for the material controlled in operation by the cam-wheel O.

13. In a measuring-device, the combination with a casing A formed with a boss $a^6$ on its interior, a driving-gear F rotatable on said boss and formed with concentric gear-rings, a worm E adapted to mesh with the gear-rings, a shaft C for the worm, a bracket B formed with a bearing for the shaft and arranged to slide on the casing to adjust the worm in relation to the gear-rings, a stud $h$ screwed into the boss $a^6$, a screw $g$ extending axially through the stud $h$ and screwed into the bracket to secure the latter on the casing, a gear K fast on the stud $h$, a second gear L rotatable on said stud, a planet-gear mounted on the gear F to engage the gears K and L, a gear N driven from the gear L, a cam-wheel O detachably secured to the gear N, and a severing-device for the material mounted on the casing and arranged to be actuated from the cam-wheel O.

14. In a measuring-device, the combination with the timing-mechanism therefor, of a member operated by the material being measured to actuate said mechanism, a severing-device operated from the timing-mechanism after a predetermined length of material has been measured comprising a bearing, a plunger rod slidable in the bearing and formed with a cutting-edge, means to slide the rod, a bushing surrounding the rod within the bearing and having a cutting-edge coöperating with that of the rod, said bushing having a plurality of radial holes, and a screw extending through the bearing with its end adapted to engage any one of the holes to provide for securing the bushing in different positions rotatively of the rod to present new cutting-edges to the material.

In testimony whereof I affix my signature in presence of two witnesses.

GEORGE W. FOSTER.

Witnesses:
L. J. HAZELTON,
GEO. W. BLACKBURN.